United States Patent

[11] 3,590,622

| [72] | Inventors | Frank E. Elge Ludlow; Thomas G. Wolfe, Kane, both of, Pa. |
|---|---|---|
| [21] | Appl. No. | 784,754 |
| [22] | Filed | Dec. 18, 1968 |
| [45] | Patented | July 6, 1971 |
| [73] | Assignee | Ernest N. Calhoun Pittsburgh, Pa. |

[54] APPARATUS FOR MAKING TUBING
5 Claims, 16 Drawing Figs.

[52] U.S. Cl. .................................................. 72/209,
72/283, 72/370, 29/477.7, 219/59
[51] Int. Cl. .................................................. B21b 17/10
[50] Field of Search.......................................... 219/59;
228/18, 47, 56.5; 72/181, 283, 370, 208, 209;
29/477.7

[56] References Cited
UNITED STATES PATENTS

| 1,120,209 | 12/1914 | Lloyd | 219/59 |
| 1,247,501 | 11/1917 | Butcher | 219/59 |
| 1,810,112 | 6/1931 | Riemenschneider | 29/477.7 X |
| 2,017,360 | 10/1935 | Waterman | 29/480 X |
| 2,934,981 | 5/1960 | Pearson | 29/480 X |
| 3,263,053 | 7/1966 | Rudd | 219/59 |
| 3,392,565 | 7/1968 | Rodder | 72/201 |

Primary Examiner—Richard J. Herbst
Attorney—Williams and Kreske

ABSTRACT: A tube mill wherein skelp is formed to tube shape and welded along a longitudinal split. The tubing is cold-worked at several passes in a manner that the coarse grain structure at the weld area is refined without affecting the surfaces of reducing dies. Means are provided to effect reciprocation of the mandrel during cold-working operations. The invention comprises methods of forming and working tubing and includes the forming of a tube from skelp having thickened longitudinal portions and cold-working the welded area to refine the weld structure approximately to that of the remaining tube.

PATENTED JUL-6 1971
3,590,622
SHEET 1 OF 3
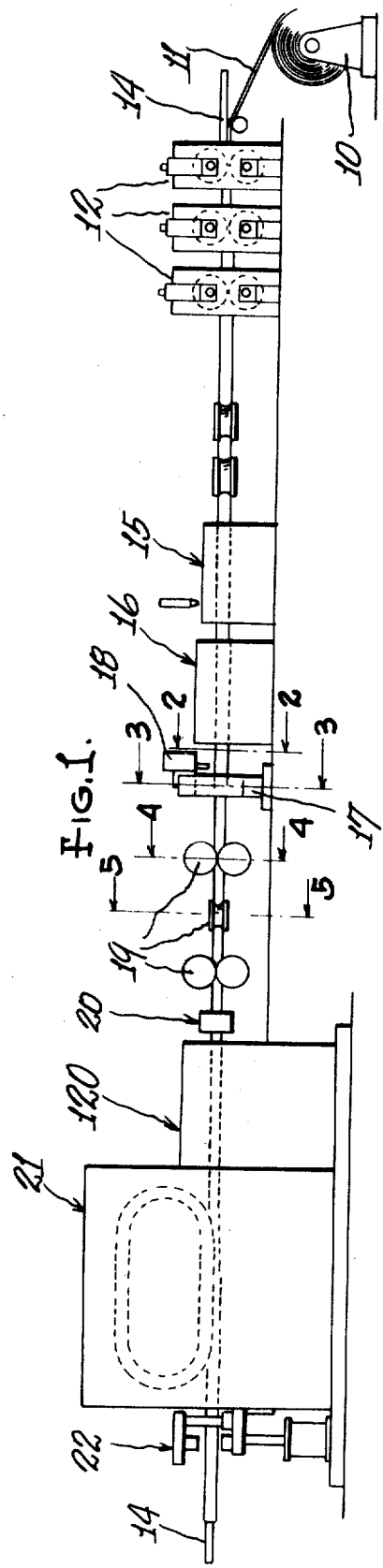
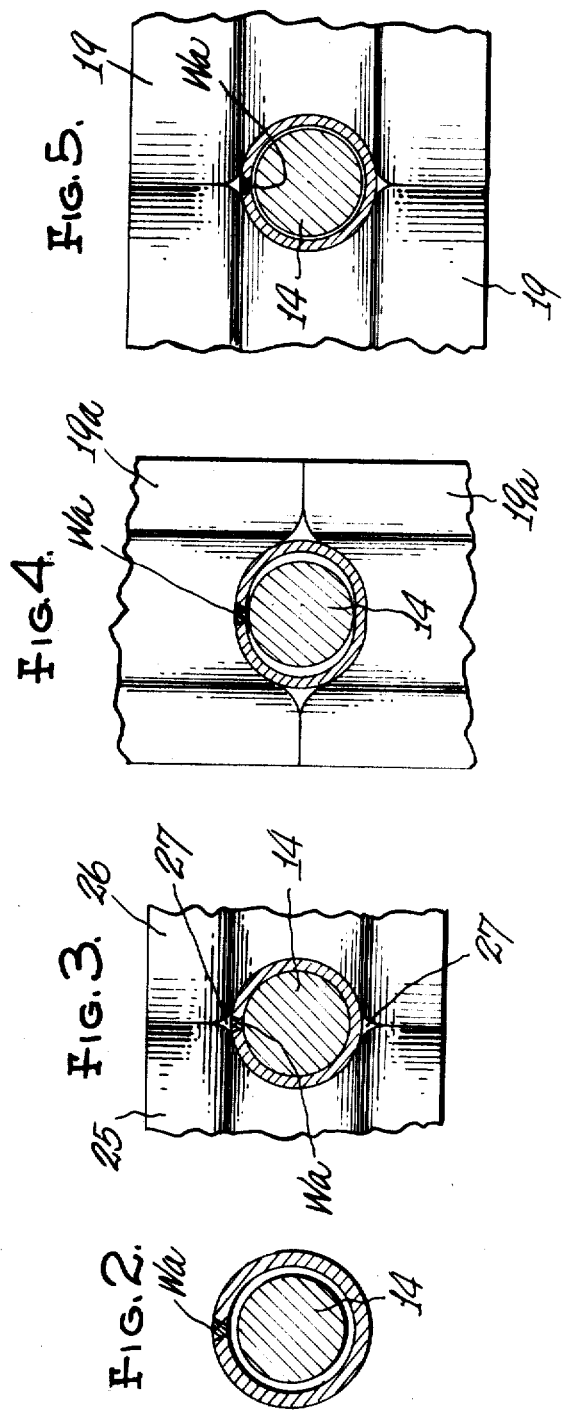
INVENTORS
FRANK E. ELGE
and THOMAS G. WOLFE
By Williams and Kuehl
ATTORNEYS

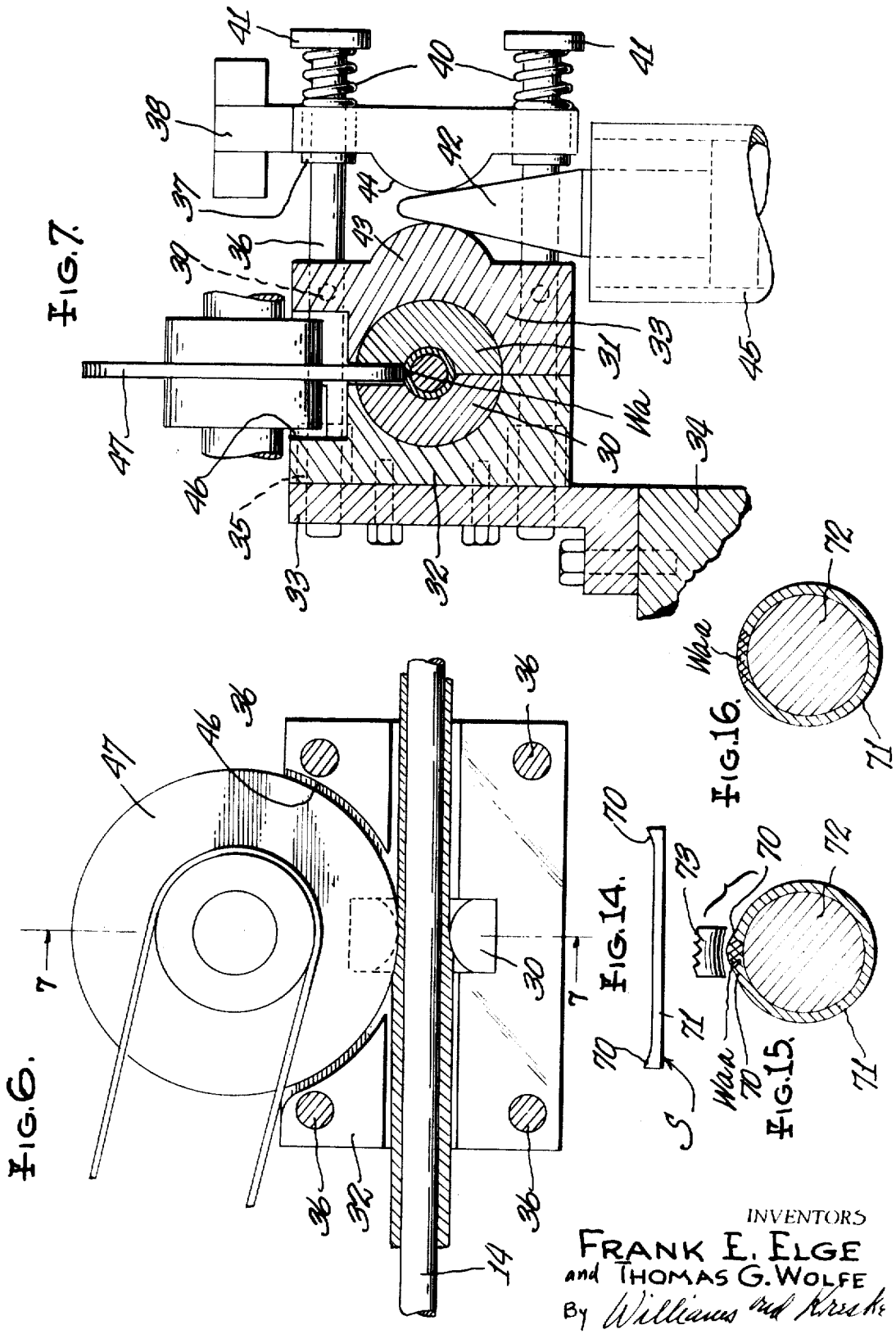

PATENTED JUL -6 1971
3,590,622
SHEET 3 OF 3
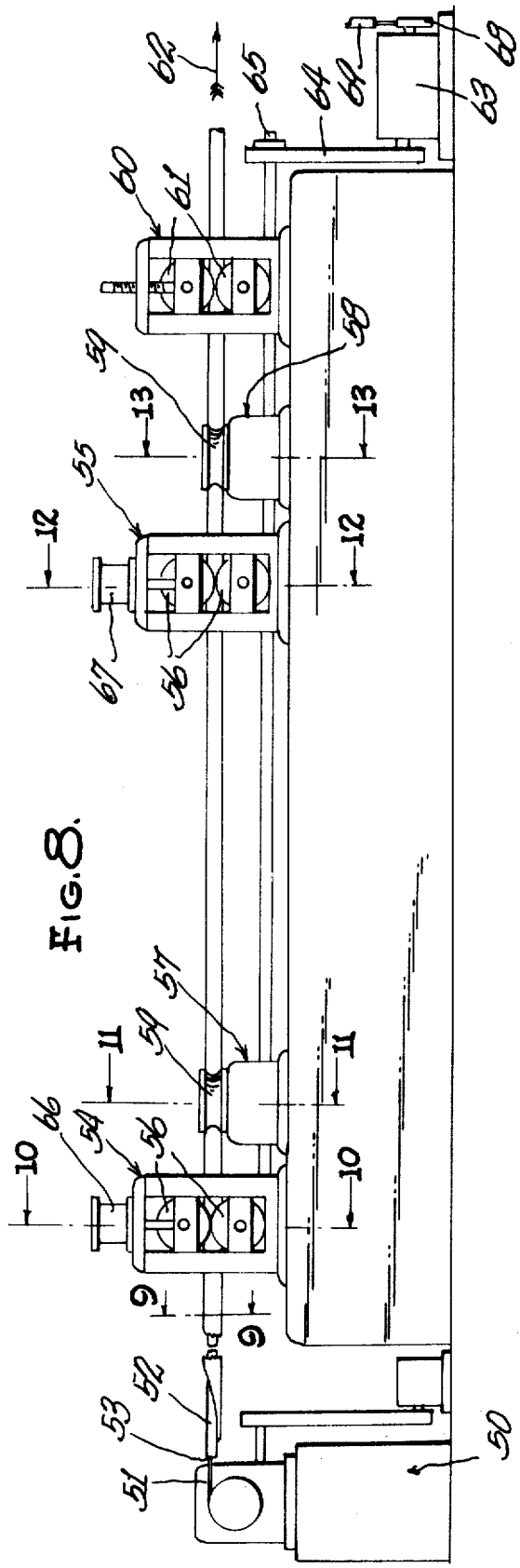
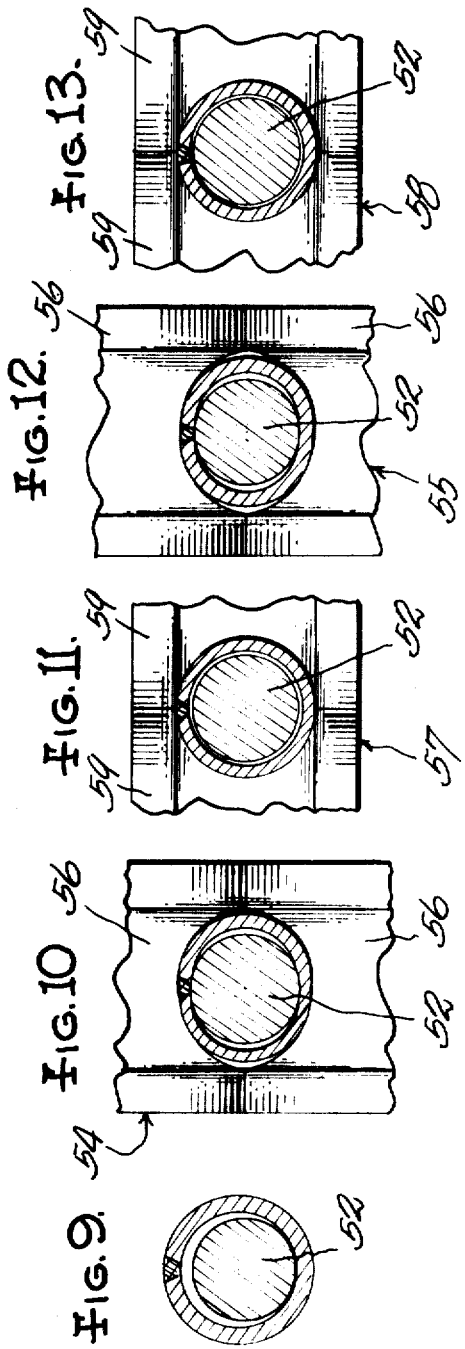
INVENTORS
FRANK E. ELGE
and THOMAS G. WOLFE
By Williams and Kreske
ATTORNEYS 3,590,622

APPARATUS FOR MAKING TUBING

BACKGROUND AND SUMMARY

Heretofore it has been common to form and weld metal tubing in one machine, and then transfer the welded tubing to a drawbench to reduce it in diameter and wall thickness. This required considerable floorspace and necessitated expensive handling operations. The present invention enables tubing to be formed, welded and cold-worked in one machine, thus effecting savings as will be appreciated. The invention includes cold-working of the tubing so that the coarse metallic structure at the weld is refined without materially affecting the die surfaces of the working structure. The invention also includes means for reciprocating a single mandrel during cold-working operations to thus conserve not only on mandrel expense but also on mandrel handling. The invention further includes formation of a tube from skelp having thickened oppositely disposed longitudinal portions so that the weld is made at those portions and substantially only the weld area is cold-worked.

DESCRIPTION OF THE DRAWINGS

In the drawing accompanying this description and forming a part of this specification, there are shown, for purposes of illustration, several embodiments which the invention may assume, and in these drawings:

FIG. 1 is a side elevational view of a tube mill, illustrating an embodiment of the invention, FIGS. 2, 3, 4 and 5 correspond, respectively, to the lines 2-2, 3-3, 4-4, and 5-5 of FIG. 1, FIG. 6 is a fragmentary sectional view illustrating another embodiment of the invention, FIG. 7 is a fragmentary sectional view corresponding to the line 7-7 of FIG. 6, FIG. 8 is a side elevational view of a cold-working portion of the invention, FIGS. 9, 10, 11, 12 and 13 are sectional views corresponding to the lines 9-9, 10-10, 11-11, 12-12 and 13-13 of FIG. 8, FIG. 14 is an end view of skelp utilized in another embodiment of the invention, and FIGS. 15 and 16 are sectional views showing the skelp welded and cold-worked.

DETAILED DESCRIPTION

The machine disclosed herein to illustrate the invention includes a payoff reel 10, of any commercial form, on which skelp 11 is coiled and from which the skelp is delivered to forming rolls 12. The rolls 12 are of standard form and are adapted to receive the flat skelp and form it into the shape of a tube of a desired diameter, but with a longitudinal split.

As the tube is being formed in the rolls 12, a elongated metal mandrel 14 is inserted longitudinally within the formed tube. As is well known in the art, the mandrel has an outer diameter slightly less then the desired inside diameter of the finished tube. The mandrel moves with the tube as the latter moves from the forming rolls to a welding station 15 which welds the split in the tube to form a closed tube with a welded seam at a predetermined location extending longitudinally of the tube. In the illustrated embodiment, and as in the usual case, the weld seam is at the top of the tube. The welder may be of any suitable commercially available type, such as arc, resistance, high frequency, or disposable electrode or any other desired type.

In order to cool the welded tube rapidly, the tube is shown as passing through a water cooling unit 16, which cools the welded seam and from there to a cold-drawing or reducing unit 17. Just prior to reaching the drawing unit 17, a drawing compound is deposited on it from a dispensing unit 18. The drawing unit comprises an arrangement of dies or rolls for reducing the outside diameter of the tubing and at the same time coacting with mandrels for reducing the wall thickness of the tubing.

From the drawing unit 17, the tube passes through rolls 19 which perform the function of further cold-working the tube and rounding it to size and freeing it from the mandrel. A sinking die 20 may be disposed within the line immediately after the last set of rolls 19. The tube then passes through a washing or degreasing chamber 120 in which dirt and grease are removed from the tube. The tube is pulled through the various constructions above mentioned and thus avoids the necessity of driving any of the rolls 12, 19 or others. The pull unit 21 herein disclosed is of the endless belt type comprising two rows of chain mounted cleats on opposite sides of the tube to firmly grip the tube without marking it. An example of a suitable pull unit is disclosed in U.S. Pat. No. 3,260,099, issued July 12, 1966.

After leaving the pull unit 21, the tube passes through a flying shear 22 which also may be of any suitable commercially available type. The shear cuts the tubing to desired length, and the mandrel is removed therefrom and returned to the entrance to the roll stands 12 for reuse. In view of the span from the roll stand to the cutoff shear, a plurality of mandrels are used and they may have end-to-end connections which provide uniform peripheral continuity and yet provide easy connection and disconnection for handling. The shear is controlled by an electronic device which senses the place where the mandrels are connected so that the shear may cut the tubing at the place or at a multiple of places.

At the start of a new tube size, skelp may be drawn off the payoff reel 10 and formed into tube formation in the rolls 12. A mandrel is at this time preferably not disposed within the leading end of the tube and before the latter is pushed through the die (by a drive which at this time is connected to rolls 12) a swaging machine, not shown, is used to reduce the tube end so that it may pass through the reducing unit 17 and derodding rolls 19 and enter the pull unit 21. When pull unit takes over, the apparatus is in condition for the proper forming of tubing.

Referring to FIG. 1, it will be appreciated that the tubing is relatively cold when it is drawn through the die of the reducing unit and the apparatus thus provides all of the improved physical qualities of cold-drawing, as heretofore practiced in a drawbench and as an operation separate from tube-forming operation. A cold-drawn tube has very fine grain structure and higher physical tensile and yield strength. The weld area is of a cast course structure until it is cold-drawn through the die.

The die unit 17 herein disclosed comprises a pair of die sections 25, 26 which are relatively movable so that they may be opened and closed. Any suitable means may be used to open and close the die sections and, as an example, the section 25 may be rigidly held against movement and the die section connected to the operating rod of a hydraulic cylinder. As seen in FIG. 3, the mating surfaces of the die sections 25, 26 are relieved to provide spaces 27. The upper space 27 is important since it passes the weld zone Wa. The lower space may be omitted, but it is frequently desirable to maintain die symmetry.

In the illustrated embodiment, the die sections are made of tungsten carbide and are ground so that about 75 percent of the inner circumference of the combined sections close tightly on the tube, leaving the spaces 27, 27 which do not close tightly on the tube. The upper space 27 exerts little or no pressure on the weld zone Wa. The metal structure at the weld zone is of cast course structure as compared to the cold-rolled structure of the remainder of the tube circumference. Usually, pulling or pushing the weld zone through a die, as heretofore done, aggravates the zone and causes "galling" which affects the quality of the tubing and in time affects the condition of the die. The rolls 19 for rolling the weld area are placed right after the die 17 and at least the first set of rolls 19a is formed with peripheral surfaces as shown in FIG. 4 so as to bear heavily on the weld zone Wa and lightly or not at all on the side surfaces of the tubing. This rolling, subsequent to the die reduction, brings the remaining 25 percent of the tubing to the same thickness as the 75 percent reduced by the die unit 17 and cold-works the weld area to greatly improve the cast structure thereof.

The rolling action in FIG. 4 forms the tubing out of round and tightens it on the mandrel and accordingly the sets of rolls in the unit 19 are displaced relative to each other to engage the tubing at a plurality of points around its circumference, causing the tubing to reround, and freeing it from the mandrel.

As before stated, the tubing is then pulled through the washing or degreasing chamber 20 and fed to the flying shear 22. The shear is set so that its blades cut through the tubing wall without biting into the mandrel. As the cut tube sections are removed, the mandrel is exposed and ultimately made available for return to the entrance end of the apparatus for reuse.

FIGS. 6 and 7 illustrate structure which enables tubing to be reduced in diameter and wall thickness and simultaneously provides rolling of the weld zone Wa. Die sections 30, 31 are supported in carriers 32, 33 respectively. The carrier 32 is bolted to a bracket 33 which is rigidly connected to a stationary support 34. The die sections and carriers therefor may be opened and closed at the will of the operator.

The carrier 32 has bushings 35 which slidably receive rods 36. The rods are also slidably received in bushings 37 carried by a stationary member 38. The carrier 33 is fixed to the rods 36, as by pins 39 or the like. Springs 40 are interposed between the member 38 and heads 41 formed on respective rods 36 and normally urge the carrier, and its die section 31 to the right as viewed in FIG. 7, to separate the die sections 30, 31.

The die sections are tightly closed upon each other by a tapered actuator 42 which is thrust between curved surfaces 43, 44. The actuator 42 is connected to the piston rod of a fluid cylinder 45 and the latter is actuated by means of any suitable controls operable manually or automatically. The carriers 32, 33 and the die sections supported thereby, are recessed, as shown at 46 to provide for passage of a roll 47 which engages the weld zone Wa at the throat of the die. The roll 47 may be positively driven on any suitable manner.

The invention further contemplates the use of a single mandrel that is reciprocated between defined extreme positions and thus reduces the cost of a plurality of mandrels and produces any length of tubing with cold-reduced wall and with a sinking pass which produces close diameter tube tolerance.

Attention is directed to FIG. 8 wherein the tubing is shown as it has left the welder and cooling unit with a mandrel 14a of a predetermined length within the tubing. In this embodiment, a cable unit 50 is preferably positioned in the line just prior to the skelp payoff reel 10, with the cable 51 extending over the strip and connecting to the mandrel 52 as shown at 53. The skelp feeds into the welding unit in tube shape around the mandrel and is welded. The welded tube, with mandrel bar within, is passed through reducing and derodding rolls in accordance with the following description.

As seen in FIG. 8, two similar reducing roll stands 54, 55 are disclosed, each stand including a pair of rolls 56–56 which press heavily on a large portion of the periphery of the tube entering the pass of the rolls, to reduce the diameter and wall thickness of the tube. Spaced a predetermined distance from each stand 54, 55 are derodding stands 57, 58, each comprising a pair of rolls 59, 59 which tend to reround the tube to free it from the mandrel 52, and in such process reducing the wall thickness of the tube portion not touched by the rolls 56–56. Downstream of the stand 58 is a further roll stand 60 which includes a pair of rolls 61 whose primary function is to drive the tube in the direction of the arrow 62.

A drive motor 63 has driving connection 64 with a shaft 65, and the latter has proper driving connection with the rolls of stands 54, 55 and 60. The stand 54 has a fluid cylinder 66 and the stand 55 has a fluid cylinder 67, for rapidly opening and closing the pass formed by the rolls 56–56 of respective stands. The motor 63 has a cam 68 which actuates a switch 69 at the proper time to effect actuation of the cylinders 66, 67.

In operation, the rolls of stands 54, 55 are held open so that the leading end of the tube and mandrel may pass freely therethrough. The rolls 59, 59 of stands 57, 58 may also be opened at this time, and may be opened and closed in unison with the rolls of stands 54, 55.

As the tube and mandrel feed through the various rolls the closed rolls of stands 54, 55 reduce the diameter and wall thickness of the tube, so that the tube becomes off-round, as seen in FIGS. 10 and 12. The tube is rounded, and freed of the mandrel, by the rolls of stands 57 and 58, as seen in FIGS. 11 and 13.

When the tube with reduced wall area from the stand 54 reaches the stand 55, the rolls of stands 54, 55 are automatically opened by actuation of the switch 69 controlling the cylinders 66, 67. At this time, only two short sections of the tube between stands 54, 57 and 55, 58 are tight on the mandrel. These short sections are freed of the mandrel when they pass through the rolls of stands 57, 58 so that the tube is entirely freed of the mandrel and the latter may be drawn rearwardly by the cable 51 and drive 50 until its starting end is at the stand 54. The rolls of stands 54, 55 are again closed on the tube when the unrolled material reaches roll stand 55. During this action, a length of tube equal to the distance between stands 54, 57 will have passed through the rolls of stand 54 without having been worked thereby, but this length of tube will be worked when it passes through the stand 55. The rolls of stand 60 effect driving of the tube at all times, even when the rolls of stands 54 and 55 are in open position.

The method above described will be repeated, with the mandrel reciprocating between its two extreme positions. Accordingly, only one mandrel is required, thus saving considerable labor which heretofore was necessary to transport mandrels from the end of the machine to the start thereof.

It will be appreciated that any number of pairs of stands 54, 57 and 55, 58 may be placed in the line, depending upon requirements. Further, the stands 54, 55 may have opening and closing dies, the type of the reducing unit 17.

The invention further includes another important feature which is based upon the desire of every tube manufacturer to improve welded tubing by cold-drawing. In prior practice, the entire periphery of the tubing is cold-worked by dies and/or rolls in order to get the weld zone refined. However, since the skelp has been cold-worked during its formation, cold-working of the entire cross section of the tubing represents costly operations.

In accordance with this aspect of the invention, and referring particularly to FIGS. 14 through 16, the skelp S is formed with thickened portions 70 opposite longitudinal edges. Such portions may be formed by a rolling operation, either before or after skelp formation at the mill. The skelp portion 71 between the thickened portion is of a thickness substantially equal to the desired wall thickness of the tubing.

The skelp S is formed to tubular shape in any suitable manner, with thickened portions 70 in adjoining relation to form the split in the tube. The portions 70 are then welded together by any suitable welding process to form the weld area Waa. A mandrel 72 is disposed within the tube in usual manner.

Thereafter, the weld area is cold-worked by dies or by the roll 73 shown in FIG. 15 which works only the weld area to refine its structure to that approximating the cold-worked structure of the remainder of the tube. Since only a small amount of the tubing periphery is cold-worked by the roll 73, it is a relatively simple matter to free the tubing from the mandrel.

We claim:

1. Apparatus for cold-working tubing on a mandrel, comprising a first pair of stands spaced longitudinally along the tubing for cold-working the tubing and thereby tightening the tubing on the mandrel, means for opening and closing said first pair of stands, in open position no cold-working being accomplished, a second pair of stands spaced from said first pair of stands in a downstream direction, one of said second stands being intermediate said first pair of stands, each of said second stands coldmworking the tubing in a manner to free it from the mandrel, control means for opening each of said first stands when approximately a portion of tubing which has been cold-reduced by the leading first stand and reworked by the said intermediate second stand reaches the trailing first stand, means for retracting said mandrel through said tubing when second stand are opened, said control means closing said second stands when said mandrel has been retracted.

2. The construction according to claim 1 and further including a sinking die downstream of said second pair of stands through which the tubing is forcibly moved to reduce its outside diameter.

3. The construction according to claim 1 wherein said tubing is welded along a substantially rectilinear longitudinal split and wherein each of said pair of stands includes rolls which are contoured to concentrate cold-working forces at the weld line.

4. Apparatus for forming and cold working metal tubing, comprising forming means for forming metal skelp into tubular form with a substantially rectilinear longitudinal split, welding means downstream of said forming means for welding said tubing along said longitudinal split as the latter passes through said welding means, a mandrel within said welded tubing, and a die downstream of said welding means having die surfaces forming a pass through which said tubing is forcibly moved, said pass having an opening at the weld line so that said die surfaces cold-work and reduce the wall thickness of said tubing by its forcible movement between said die surfaces and said mandrel, except at said weld line, and a roller wheel having its outer periphery extending through said pass opening and pressed into engagement with the outer surface of the weld to cold-work the weld by its confinement between the roll periphery and said mandrel.

5. Apparatus according to claim 1, wherein said die comprises a pair of die sections, one section being fixed and the other movable toward and into abutment with said fixed section to form a pass, said die sections having complementary recessed portions and in abutting relation forming a complete pass except for the opening provided by said recessed portions, said opening being of a size to closely but freely accommodate the side surfaces of said roller wheel.